(12) United States Patent
Koch et al.

(10) Patent No.: US 11,828,398 B2
(45) Date of Patent: Nov. 28, 2023

(54) DEVICE FOR INSERTING A PIPE INTO AN ELONGATED CAVITY

(71) Applicant: TRACTO-TECHNIK Gmbh & Co. KG, Lennestadt (DE)

(72) Inventors: Elmar Koch, Eslohe (DE); Martin Köper, Attendorn (DE); Lucas Jostes, Finnentrop (DE); Stefan Hermes, Lennestadt (DE)

(73) Assignee: TRACTO-TECHNIK Gmbh & Co. KG, Lennestadt (DE)

( * ) Notice: Subject to any disclaimer, the term of this patent is extended or adjusted under 35 U.S.C. 154(b) by 511 days.

(21) Appl. No.: 16/899,609

(22) Filed: Jun. 12, 2020

(65) Prior Publication Data

US 2020/0400264 A1   Dec. 24, 2020

(30) Foreign Application Priority Data

Jun. 14, 2019   (DE) .................... 10 2019 004 171.2

(51) Int. Cl.
*F16L 55/18*   (2006.01)
*F16L 55/165*   (2006.01)
*B25J 15/00*   (2006.01)

(52) U.S. Cl.
CPC ....... *F16L 55/1657* (2013.01); *B25J 15/0028* (2013.01); *B25J 15/0033* (2013.01)

(58) Field of Classification Search
CPC . F16L 55/1657; B25J 15/0028; B25J 15/0033
USPC ........................... 138/97, 98; 405/184.2, 151
See application file for complete search history.

(56) References Cited

U.S. PATENT DOCUMENTS

| | | | |
|---|---|---|---|
| 968,022 A | 8/1910 | Baker et al. | |
| 3,178,793 A * | 4/1965 | Rosengarten, Jr. ... | F16L 55/178 249/90 |
| 3,580,448 A | 5/1971 | Cagle, Sr. | |
| 4,504,171 A * | 3/1985 | Florence, Jr. ........... | F16L 55/18 405/184.2 |
| 4,685,831 A | 8/1987 | Mahoney | |
| 2009/0129869 A1* | 5/2009 | Zivanovic ............... | B29C 63/32 405/184.2 |
| 2010/0008731 A1* | 1/2010 | Kakine ................... | B29C 53/72 156/391 |
| 2012/0298241 A1* | 11/2012 | Streatfield ............... | B29C 63/32 138/97 |
| 2017/0009908 A1 | 1/2017 | Laurini | |

FOREIGN PATENT DOCUMENTS

| | | |
|---|---|---|
| DE | 10 2006 030 802 A1 | 1/2008 |
| GB | 2 227 543 A | 8/1990 |

* cited by examiner

*Primary Examiner* — James F Hook
(74) *Attorney, Agent, or Firm* — Howard IP Law Group, PC

(57) ABSTRACT

A device for inserting a pipe into an elongated cavity, comprising at least two pipe grippers which can be moved along a curved path and which are arranged and designed in such a way that they grip around the pipe at least in sections and, in the gripped state, they move curved at least for a portion.

22 Claims, 4 Drawing Sheets

DEVICE FOR INSERTING A PIPE INTO AN ELONGATED CAVITY

FIELD OF INVENTION

The invention relates to a device for inserting a pipe into an elongated cavity.

BACKGROUND

In the area of pipe renovation, it is common to move new lines or pipes into old existing lines or pipes. It is possible that the old existing line or the old existing pipe is destroyed or expanded and a new line or a new pipe is introduced. The aforementioned method of destroying the old pipe or line is known as "burst lining". Alternatively, it is also possible to do without the burst lining and, with a certain cross-section reduction, to pull the new line or the new pipe into the old existing line or the old existing pipe ("relining technique").

Especially in the inner-city area, the occupancy density in the subsurface is very high, such that the old lines or pipes are refurbished on the one hand by tube renovation measures or on the other hand new lines or pipes, in particular made of polyethylene, are pulled in. The tube or the pipes are selected with regard to the outer dimension such that they can be drawn in or pushed into the existing line or pipe.

Pushing a new pipe into an existing pipe or line is particularly widespread in the area of gas networks. Pipes in the area of gas networks are still made from old cast pipes, whereby leaks are increasingly occurring and therefore a comprehensive renovation is carried out by inserting new pipes into the old pipe using the "relining technique" outlined above.

Whereas in the past lines were both pushed and pulled into existing old lines, now almost exclusively insertion is carried out, because previously when the line was pulled into the old existing line, overstretching of the new line often occurred, which might lead to impairment of the new one.

To insert a pipe for the purpose of "relining", it is known to insert a line or a pipe into an existing line or pipe by means of a gripping device attached to an excavator. The disadvantage here is that the excavator requires access to the ground from above, which requires a large excavation pit. Furthermore, a certain skill of the excavator operator is required to insert the pipe or line into the existing line without complications.

Linear pipe insertion devices are also known in which a cylinder extends and retracts and the new pipe is held by means of a gripper arm and is pushed into the old pipe by the movement of the cylinder. It has been shown that the contact area of the gripper with the new pipe is usually very small, such that only small forces can be transmitted, or—if greater forces are applied—the new pipe can be damaged very quickly. Furthermore, a relatively large construction pit is also required here.

It is also known to insert a pipe by means of two endless transporting or conveyor belts or chains contacting the pipe. The new pipe is clamped between an upper and a lower conveyor belt. The two conveyor belts are driven in opposite directions and the clamped new pipe is pushed into the old pipe. This requires a great deal of operational and mechanical effort, the conveyor belts contacting the new pipe also have to be positioned in the area of a large construction pit.

The previously known methods for inserting a pipe into an existing old line have a relatively large construction pit in common. This makes the construction costs for the construction of the excavation pit and in particular the subsequent restoration of the surface very expensive. Furthermore, due to the structural situation on site, it is not always possible to create an appropriate excavation pit. This usually results in increased planning efforts to find the suitable position for the excavation pit. But even with careful planning, it is usually found on site that the excavation pit cannot be built as planned due to unmapped underground installations.

SUMMARY

The task is therefore to enable an excavation pit for a pipe insert, which is preferably small, in which a safe insertion with the lowest possible load on the pipe is nevertheless provided.

The object is achieved according to the subject matter of the independent claims. Advantageous embodiments are the subject of the respective dependent claims and the description.

The main idea of the invention is to use at least two pipe grippers which move along a curved path designed as an at least partially curved path and which grip the pipe during the movement, the movement of the pipe grippers being predetermined by means of the curved path, and the pipe during the gripping and moving is or becomes curved at least in sections. The pipe can thus be reduced over a certain area (i.e. essentially the curved area) with respect to its extent in one direction, in particular in the area of an excavation pit, and thereby pushed forward and ultimately pushed into the cavity. By means of the curved path and the associated guidance with the pipe grippers, a curvature of the pipe is possible, in which an axis of curvature can be aligned transversely to the longitudinal axis of the beginning of the cavity. In this way, a curvature can be achieved whereby a small construction pit is sufficient for arranging the device therein in order to insert the pipe into the cavity. In particular, the insertion force can also be applied by means of the pipe grippers which impart the curvature to the pipe. The insertion force can be applied along the curved pipe. In particular, it can be ensured that radii and forces for gripping or grasping the pipe are adapted to the material and/or the circumference of the pipe. The pipe can be deflected along a defined bending radius and inserted continuously into the cavity. The pipe can be prevented from buckling due to the thrust force introduced.

The invention provides a device for inserting a pipe into an elongated cavity. The device has at least two pipe grippers which can be moved along a curved path and which are arranged and designed in such a way that they grip around the pipe at least in sections and, in the gripped state, move it curved at least in sections.

It has been found that the aforementioned device can also be used in the so-called keyhole technique. The diameter of an excavation pit in the so-called keyhole technique is approximately 0.6 m. Such an excavation pit is not yet sufficient for the device, but a so-called triple keyhole, in which the overlap of three keyholes results in an overall length of only 1.5 m, may be sufficient. The individual keyholes form three overlapping circular openings on the surface. As a result, the excavation pit can be kept very small so that the area used is only very small, and the disruptions, in particular for current traffic, can be reduced to a minimum. Furthermore, the cores previously cut out can be glued in again after the construction work has been completed in the course of restoring the surface. As a result, any asphalt work can be omitted and thus a significant cost saving in the construction work is possible.

Investigations by the inventors have shown that even with larger pipe diameters of up to 125 mm, a starting pit of 1.5 m in length can be sufficient. For pipes with a smaller diameter, starting pits with an even shorter length can be reached.

There is an added value for the users of the invention, since a small construction pit can be used, which is easier to plan and can also be filled in again with less effort than a large construction pit. At the same time, a safe insertion of the pipe is possible with the device. The device combines the function of a defined pipe routing/curvature of the pipe with the transmission of a thrust force on the pipe. All pipes—regardless of their diameter—can experience only a brief curvature, such that no impairment in terms of rigidity and pressure resistance is to be expected on the pipe itself.

The inventors have recognized that an insertion force of 15 kN or more is possible with the device according to the invention. These forces are sufficient to insert a pipe into an existing elongated cavity over long distances, since continuous insertion is made possible, such that in contrast to discontinuous insertion with timed processes, no static friction has to be repeatedly overcome.

In the sense of the description, the term "pipe" encompasses any elongated element which can be introduced as a hollow body or as a partially filled body into an existing line or pipe, in particular for the purpose of "relining". In the sense of the description, the term pipe thus includes an elongated hollow body, in which the length is generally substantially greater than the diameter. In the sense of the description, however, a pipe can also be a line in which one or more further lines or pipes can be present in the cavity. The lines or pipes present in the cavity of the pipe or the line can be, for example, electrical conduits or cables, but also other pipes or lines. Any plastic material from which bendable pipes can be made, for example also reinforced plastics, can be used for the pipe.

In the sense of the description, the term "elongated cavity" encompasses a cavity that can be refurbished in particular by means of the "relining technique" and is in particular designed as a pipe or line, the cavity being able to have an intact or damaged wall. The elongated cavity is arranged in particular in the soil.

The term "soil" in the sense of the present description encompasses any type of material, in particular earth, sand, rock and/or stone, in which an existing elongated cavity is formed. In particular, the term soil includes the soil in which a pipe or line is arranged for the purpose of supply and/or disposal. In particular, a pipe or a line for supply and/or disposal is a pipe or a line within a gas, water, communication, media or power line network.

The term "curved path" in the sense of the description includes the presence of a structural element in the form of a support, a backdrop, a rail and/or a support or the like, by means of which the pipe grippers can be moved along an at least sectionally curved path. The curved path includes an at least sectionally curved path that is not linear. The term "curved at least in sections" is used to also encompass the possibility that a linear part may be present; what is important, however, is the curvature present in at least one section as part of the curved path. The curved path can thus specify a spatial curve or the course of a spatial curve along which the pipe grippers are moved.

Essentially, two configurations are possible for the curved path. According to a first embodiment, the pipe grippers can move along or relatively on or to a particularly wheel-shaped beam, slide, rail, support or the like which specifies a course of the curved path (alternative a). According to a further embodiment, the pipe grippers can be fastened on a moving or rotating around an axis, in particular wheel-shaped, beam, slide, rail, support or the like (alternative b).

The beam or the like can have a surface, in particular a peripheral surface, which is curved and on which the pipe grippers can move or run (alternative a) or on which the pipe grippers are fastened (alternative b). Mixed forms of the two alternatives mentioned are possible.

For a particularly simple embodiment, it can be preferred to attach the at least two pipe grippers to a curved surface in space and to rotate the curved surface in space. The curved surface can, in particular, be a circle or be configured in a circular manner, so that the pipe grippers can be arranged on a wheel facing outward. The pipe grippers can be moved together with the wheel. The embodiment is preferred because a uniform and round movement of the pipe grippers can be carried out. The movement of the pipe grippers with a wheel can be carried out as a very stable movement.

The curved path can have radii of curvature at least in sections, so that the curved path is designed at least in sections in the form of an arc segment. As a result, a uniform curvature can be impressed on the pipe. The curved path can also have a segment of an ellipse arch, at least in portions. Any curved shapes are possible as long as the curved path is essentially continuous, i.e. runs essentially without jumps and/or offsets.

The curved path in the sense of the description is self-contained for a simplified embodiment in order to be able to guide the pipe grippers endlessly. The curved path can define the movement of the pipe grippers on a curved track. The curved path can essentially specify a movement of the pipe grippers in one plane. The curved path is configured in one plane, in particular essentially in only one plane. As a result, the space required for the device is kept small and the effect on the pipe is reduced. Not only is the reduction small in a plane in which the curvature is formed, but also in the plane transverse to the curvature.

The pipe grippers can run on a self-contained curved path. The curved path can have a ring closure. The pipe grippers can be repeatedly guided along the curved path in one direction, as a result of which the pipe grippers can repeatedly pass or run through the curved path in one direction. The pipe grippers can move continuously along the curved path, i.e. without a reversal of motion when inserting the pipe into the cavity.

The curved path can be designed in such a way that the pipe does not have less than a defined bending radius. For example, the curved path can have a smallest radius of 0.6 m, so that with the pipe gripper that rotates on this path and grasps the pipe the radius for the pipe is 0.7 m. Depending on the outside diameter of the pipe, other radii are also possible for the curved path and thus also for the pipe itself.

The term "pipe gripper" in the sense of the description includes a structural element of the device for inserting a pipe, with which the pipe to be inserted is gripped or grasped in order to move the gripped pipe. The pipe gripper can contact or grip the pipe by means of a form fitting and/or frictional locking. If the term "grasp at least in sections" is selected in the description, this means that it is sufficient in order to form a form fitting and/or frictional locking for the pipe to be gripped or contacted in a partial area of its circumference. A force can be applied to the gripped pipe to be inserted by means of the pipe gripper when the pipe gripper moves. For this purpose, the pipe gripper grips the pipe at least in sections over a period of time and moves the pipe along a path in the gripped state. Due to the presence of at least two pipe grippers that are moved on a curved path and are arranged one behind the other, in particular adjacent, with respect to the movement along the curved path, the pipe can be moved on a curved path if the two pipe grippers have gripped the pipe and are moved according to the curved path on a non-linear path.

The term used in the description "to move curved at least in sections in the gripped state" includes the possibility that the pipe can also be moved linearly in a section, but there is at least one section in which the pipe is moved curved.

In the simplest case, the path along which the pipe is moved can essentially be described by a section of the curved path in which the pipe grippers grip the pipe or it can run offset parallel to it. The pipe thus essentially follows the curved path along which the pipe grippers which are gripping the pipe move. In addition to the parallel offset between the curved path and the pipe, which results from the fact that the pipe grippers, in particular at the ends, run off from the curved path (alternative a) or are attached to a curved path and move with it (alternative b) and grip the pipe with the other end, the pipe gripper can also perform a translational movement with respect to the curved path when it rotates on the curved path. For example, the pipe gripper can be moved radially or transversely to the curved path relative to the curved path. It can also be provided that the pipe gripper can tilt along the curved path about an axis parallel to it.

The curved path can be placed in the construction pit by means of a frame in order to securely support the curved path. For this purpose, a standing surface, one or two end-side support surface(s), which can run essentially parallel to an axis of curvature of the curved path, and/or one or two side support surface(s) intersected by an axis of curvature of the curved path can be provided.

Since the number of pipe grippers increases the clamping force or force for inserting the pipe, i.e. the insertion force, there are preferably more than two pipe grippers, in particular three, four, five, six, seven etc. Any integer number of pipe grippers can be provided, whereby in addition to the contact surface for contacting the pipe, the possibility can also be taken into account that with an increasing number of pipe grippers along a curved path the possibility is increased that the pipe can be moved more precisely along the curved path. It is preferred that the entire curved path is covered with pipe grippers essentially along its entire length, so that in addition to an increase in the clamping force or push-in force, the pipe to be inserted is guided as continuously as possible along the curved path. The higher the number of pipe grippers on the curved path, the better the gripped pipe can replicate the shape of the curved path.

It is obvious that the pipe grippers of a curved path cannot or do not all have to grip around a pipe at the same time. Rather, some of the pipe grippers are not in contact with the pipe, in particular on a closed curved path, but run from an angular area in which they had gripped the pipe and have applied an insertion force to the pipe, to an angular area without contact with the pipe, in particular in order to get into the angular range once more for again grasping and inserting the pipe. An angular area of the curved path in which the pipe grippers are in the closed position can be framed by an angular area of the curved path in which the pipe grippers are in the open position. In a preferred embodiment, the angular range of the closed position and the angular range of the open position result in the entire curved path. It may also be possible that the pipe grippers are nevertheless in a closed position in an angular range in which no pipe is gripped. This can be the case, for example, because in particular if the closed position is reached by means of a spring tension, the springs of the pipe grippers in question are relaxed. As a result, the spring forces can be reduced compared to forces generated when pipe grippers are open.

At least one of the pipe grippers preferably has at least one clamping jaw, which can be moved relative to a counter element or a further clamping jaw. This enables the pipe gripper to grip the pipe safely. Furthermore, by means of the movement of the pipe grippers along the curved path, the pipe gripper is transferred from an open position in which the pipe is released to a closed position in which the pipe is gripped. The movement of the clamping jaw enables a position in which the pipe is released and a position in which the pipe is gripped. If there is at least one clamping jaw and a counter element, the counter element can be fixed or stationary in space or along the curved path. This enables a particularly simple configuration. Alternatively or additionally, it can be provided that two clamping jaws are provided, which in turn are both designed to be movable relative to one another. Both jaws can move relative to the curved path to exert the closed or open position. The open position ensures that the pipe can enter the pipe gripper. The closed position ensures that the pipe can be pushed by the pipe gripper. The closed and also the open position can extend over an angular range of the curved path.

The relative movement of the clamping jaw to the counter element or the further clamping jaw between the closed position and the open position is directed essentially transversely to the movement of the pipe gripper on the curved path. The insertion takes place transversely to the direction of movement of the clamping jaw, such that a pushing force is applied by the movement of the pipe gripper transversely to the "gripping force" of the pipe gripper.

The clamping jaw preferably has an indentation which corresponds to the outer circumference of the pipe. As a result, clamping jaws can be used which are adapted to different pipe shapes or diameters. The device can thus be adapted to different pipe shapes or diameters.

The jaw or the plurality of jaws can be coated on a partial surface that comes into contact with the pipe, i.e. in particular on the contact surface, at least in sections, in order to increase a frictional force between the clamping jaw and the pipe. This enables the pipe to be gripped more securely and the insertion force to be applied more efficiently. Furthermore, wet or soiled pipes can also be gripped particularly well.

In a preferred embodiment, the pipe gripper is preloaded in the closed position. As a result, a constant force can be applied to the pipe gripper, which can lead to a secure gripping of the pipe. The pipe gripper can be preloaded, for example, by means of a spring preloading in the closed position. The pipe gripper can also be closed by means of a further curved path, such that the pipe gripper is positively guided both in the closed and in the open position. Alternatively or additionally, it is possible for the pipe gripper to be preloaded in the closed position by means of a compressed air cylinder. Alternatively or additionally, the pipe gripper can be preloaded in the closed position by means of a hydraulic cylinder. The pipe gripper can alternatively or additionally be closed by means of magnets or the like. At least when the pipe gripper is preloaded in the closed position by means of a spring pretension, the pipe gripper can have a roller that runs over a switching surface designed on the curved path, thereby initiating an opening of the clamping jaw. A simple configuration of the opening and/or closing is possible.

The open position and the closed position of the pipe grippers are preferably selected as a function of the position of the pipe grippers on the curved path, such that automation or an automatic sequence in which position the pipe gripper closes and/or opens is already predetermined by the curved path. The pipe grippers can be in a closed position over an angular range of the curved path, which can in particular be predetermined, and there is at least one further angular range of the curved path, which can in particular be predetermined, in which the pipe grippers can be in an open position.

In particular, a switching surface can be used to act on the pipe gripper in order to bring the pipe gripper into the closed position or the open position. It is also possible that the position is detected by means of an electrical sensor or an electrical position transmitter and the pipe gripper is accordingly brought into a closed position or an open position. The switching surface can in particular be fixed in relation to the movement of the pipe grippers in space.

There is preferably a switching surface for the pipe gripper designed as a contact surface, along which the pipe grippers can run with a roller. By means of an interaction of the roller with an embodiment of the contact surface, the pipe gripper is brought from an, in particular spring-loaded, closed position into an open position. In this way, a simple design of a closed position, in particular spring-loaded, can be created, which can be converted into an open position by means of a mechanical interaction. The manufacture is simplified and the embodiment requires little maintenance. Long service life is achievable.

In a preferred embodiment, a drive, which is in particular a hydraulic drive, is present. This enables a drive with which high forces can be applied to insert the pipe. In addition, a hydraulic drive or hydraulic actuator is known in the field and is often used. Uniform and exact movements are also possible. In particular, in the case of tubular grippers in the form of a wheel, which are arranged fixedly on the curved path, a hydraulic drive in particular can sit in the center of the axis and rotate the insertion wheel.

In a preferred embodiment there is an entrance guide and/or exit guide for the pipe in front of or behind the curved path or the pipe grippers grasping the pipe in relation to the open or closed position of the pipe grippers, the entrance guide being in the area of the pipe grippers which are in the open position and the exit guide is in the area of the pipe grippers which are transferred from a closed position to the open position. Additional support for the pipe that is inserted is possible through the entrance and/or exit guide.

In a preferred embodiment, the input guide and/or the output guide is designed to be straight or curved. This allows one to respond to particular requirements. For example, in the area of the introduction, a "pre-bent" or curved shape of the pipe can already be predetermined by a curvature of the entrance guide. In addition to the support of the pipe, the exit guide can be provided in order to push the pipe to be inserted as straight as possible into the ground. For this purpose, the exit guide can be straight or slightly curved. The slight curvature can be directed, for example, in the opposite direction to the curvature imposed by the pipe grippers. A possible opposite direction of the curvature of the exit guide can be provided in particular to compensate for the residual stresses in the pipe. The input guide and/or output guide can be designed in the form of a slide rail, insertion sleeve, roller conveyor, slide surface or the like.

In a preferred embodiment, a cutting element is movably arranged between two adjacent pipe grippers of the curved path in such a way that the pipe can be cut at least in sections. The cutting element can perform a translational movement in a direction radial to the curved path and/or a movement in the circumferential direction of the pipe. In particular, there can be a lock with a control that prevents movement of the pipe grippers when the cutting element is moved and/or there can be a lock with a control that prevents movement of the cutting element when the pipe grippers are moved. In this way, an interplay between the movement of the pipe grippers and the movement of the cutting element can be achieved, which only allows a movement of the two of them. If one of the two elements, pipe gripper or cutting element, is moved, the other cannot move. This prevents a collision or dangerous interaction of the two elements.

In the sense of the description, the term "cutting element" encompasses an element with which an at least partial cutting of the pipe is possible. In particular, the term "cutting element" includes a blade. The material of the cutting element is suitable for cutting the pipe and selected from materials made of iron, steel, ceramic, titanium, plastic, according to the material of the pipe.

The term "cut at least in sections along the circumference" includes the possibility that the pipe is cut completely or partially along its circumference in order to obtain two parts of the pipe.

The invention also provides for the use of a device for inserting a pipe into an elongated cavity. In the device, at least two pipe grippers movable along a curved path are used, which are arranged and designed in such a way that they grip around the pipe at least in sections and, in the gripped state, move it curved at least in sections.

Like the following description of exemplary embodiments, the above statements do not constitute any waiver of specific embodiments or features.

BRIEF DESCRIPTION OF THE DRAWINGS

The invention is explained in more detail below by way of example using one of the exemplary embodiments shown in the figures.

The figures show.

DETAILED DESCRIPTION

Figure 1:
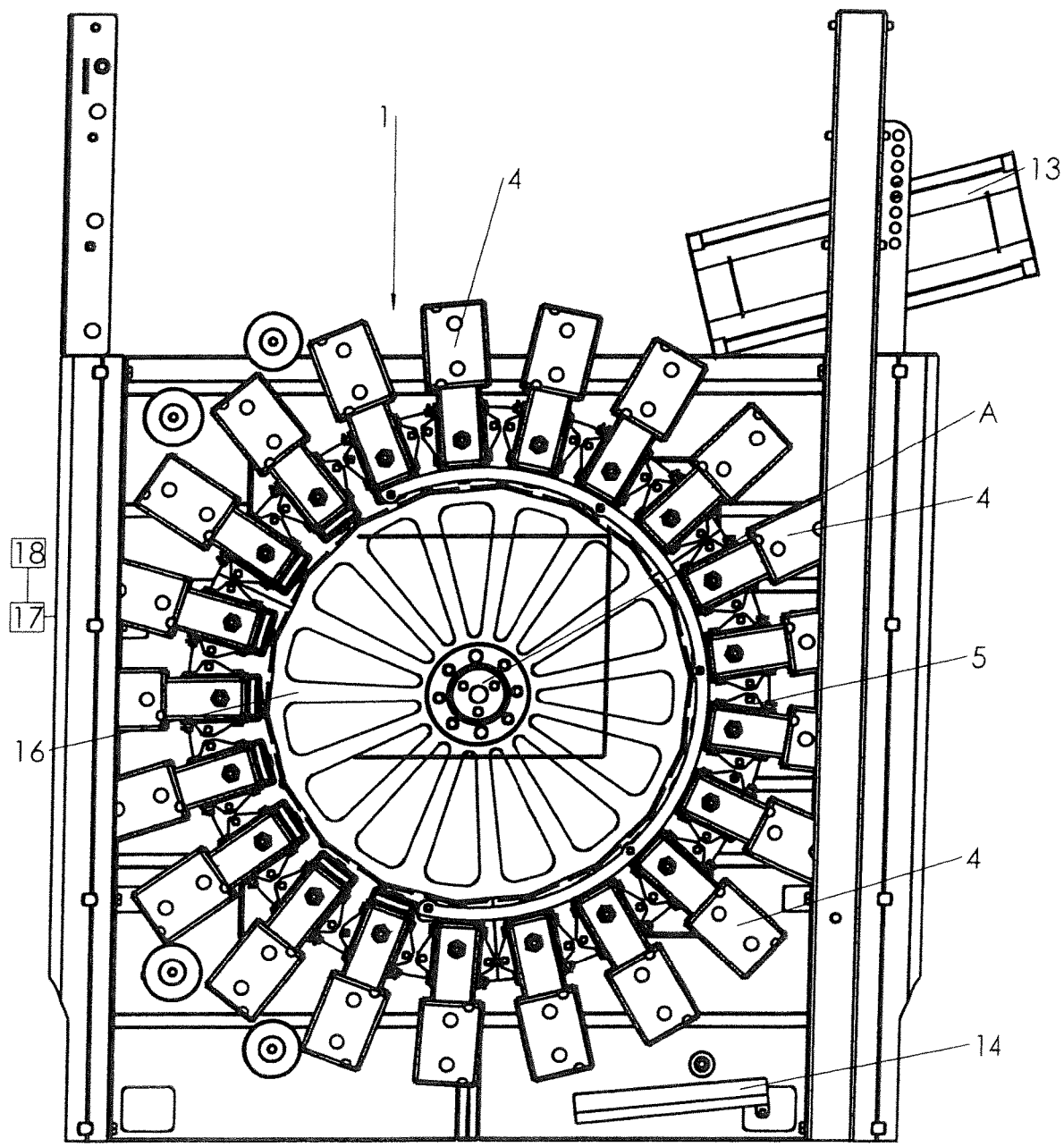
FIG. 1 a side view of a device for inserting a pipe into an elongated cavity.

FIG. 1 shows a side view of a device 1 for inserting a pipe 2, which is not shown in FIG. 1. The device 1 can be used to insert the pipe 2 into an elongated cavity 3 (see FIGS. 2 to 4). The device 1 has 21 pipe grippers 4. The 21 pipe grippers 4 are attached to a curved path 5, which has a circular circumference or is designed in the form of a wheel. The pipe grippers 4 are moved about the axis A, which is the center of the circular circumference or the wheel in space, with the curved path 5. The pipe grippers 4 essentially delineate a circle as they move along the curved path 5. The pipe grippers 4 rotate with the curved path 5 as an inserting wheel 16 counterclockwise.

The pipe grippers 4 are arranged and configured with respect to the curved path 5 in such a way that they grip around the pipe 2 at least in sections over an angular range along the curved path and move them along a path in the gripped state.

Figure 2:
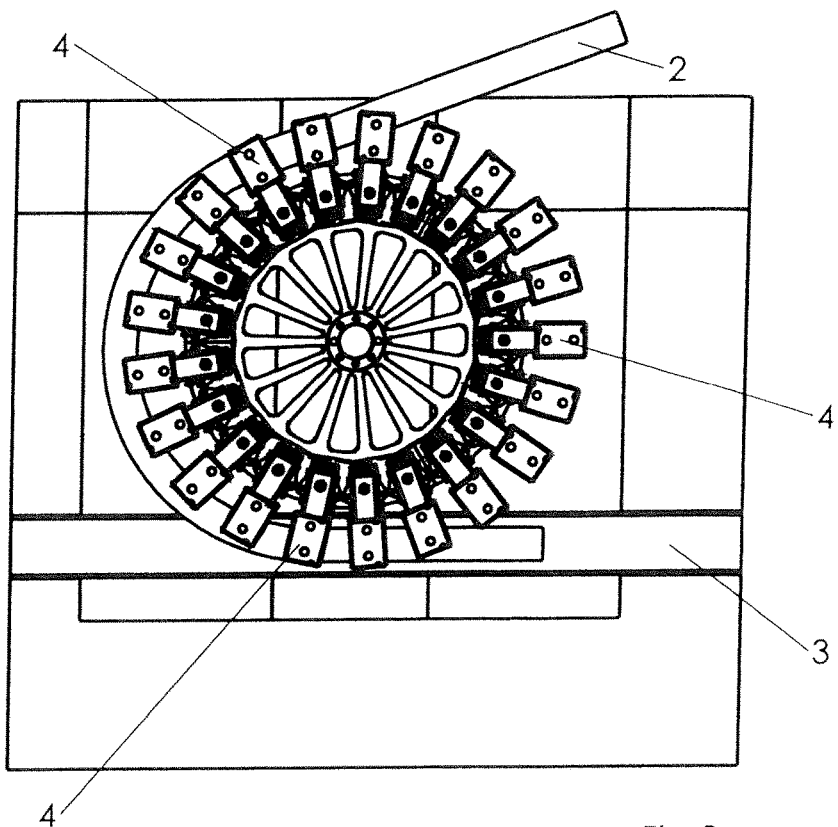
FIG. 2 a side view of a device for inserting a pipe into an elongated cavity, as it is arranged in an excavation pit, with a pipe.
Figure 3:
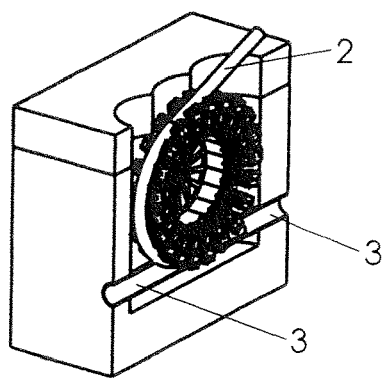
FIG. 3 a device arranged in a construction pit for inserting a pipe into an elongated cavity in an isometric view with a pipe and other construction pits.

FIG. 2 shows a side view of the device 1 for inserting a pipe 2 with a pipe 2 as it is gripped by the device 1 by means of the pipe gripper 4 and inserted into the elongated cavity 3. The insertion takes place in the selected representation in a counterclockwise direction.

Looking at FIG. 2, the pipe 2 first enters the area of the device 1 from the top right.

The pipe 2 is gripped by the pipe grippers 4 from around 11 o'clock and the pipe grippers 4 in the angular range up to around 6 o'clock grip the pipe 2, so that approximately 10 pipe grippers 4 constantly grip and move the pipe 2 when inserted into the cavity 3.

For the pipe 2 to enter the pipe gripper 4, the pipe gripper 4 is in the open position at the top at approximately 12 o'clock to 11 o'clock, so that the pipe 2 can enter the open pipe gripper 4 from above.

From the 6 o'clock position, the pipe grippers 4 are also in the open position, so that the pipe grippers 4 can move upwards again along the curved path 5 from the pipe 2. All pipe grippers 4 can thus be in the open position in the angular range from approximately 6 o'clock to approximately 11 o'clock.

Figure 4:
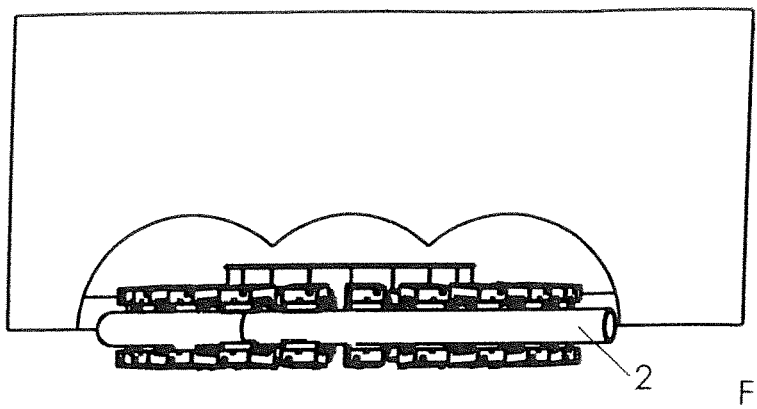
FIG. 4 a plan view of the device of FIG. 2.

FIG. 4 shows how the construction pit, in which the insertion device 1 is arranged, essentially originated. The keyhole technique was used in that three essentially circular, overlapping holes were drilled vertically into the ground. Each individual circular hole has an approximate diameter of 0.6 m. The result is an excavation pit that is essentially approximately 1.6 m long.

Figure 5:
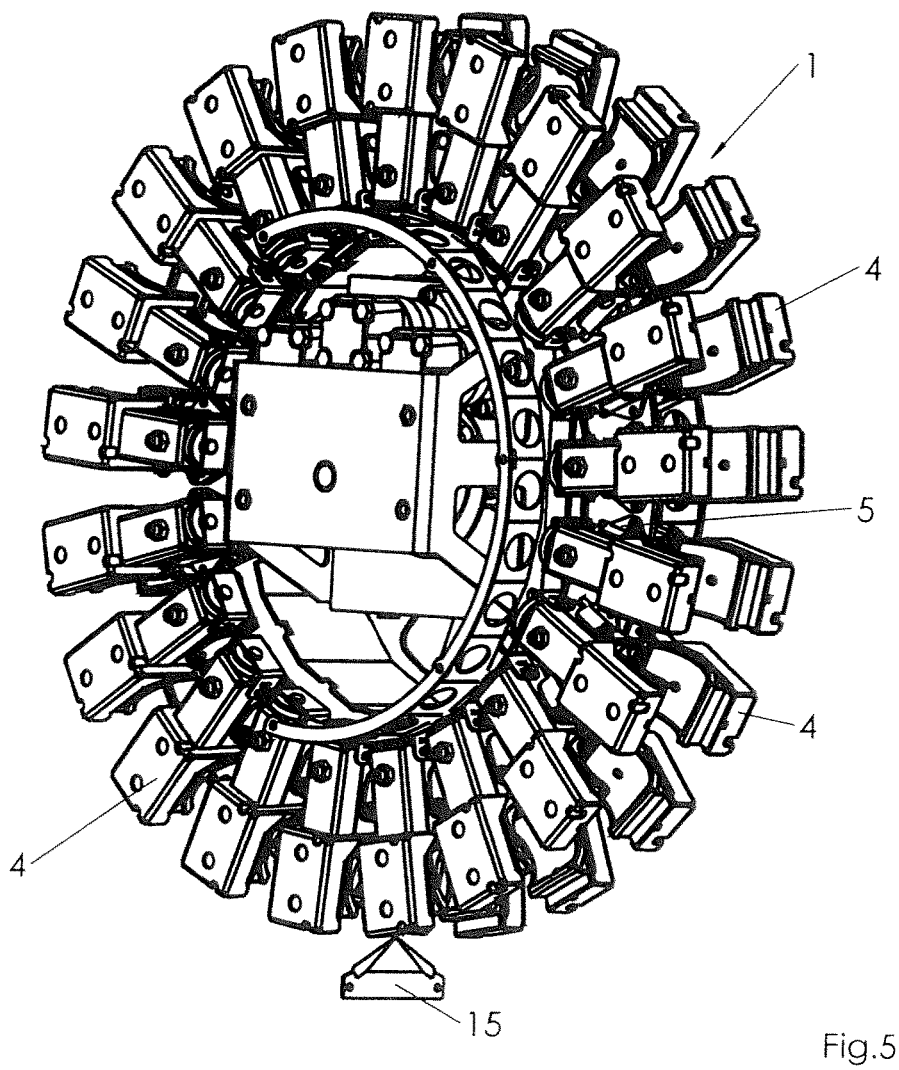
FIG. 5 a device for inserting a pipe into an elongated cavity in an isometric view.
Figure 7:
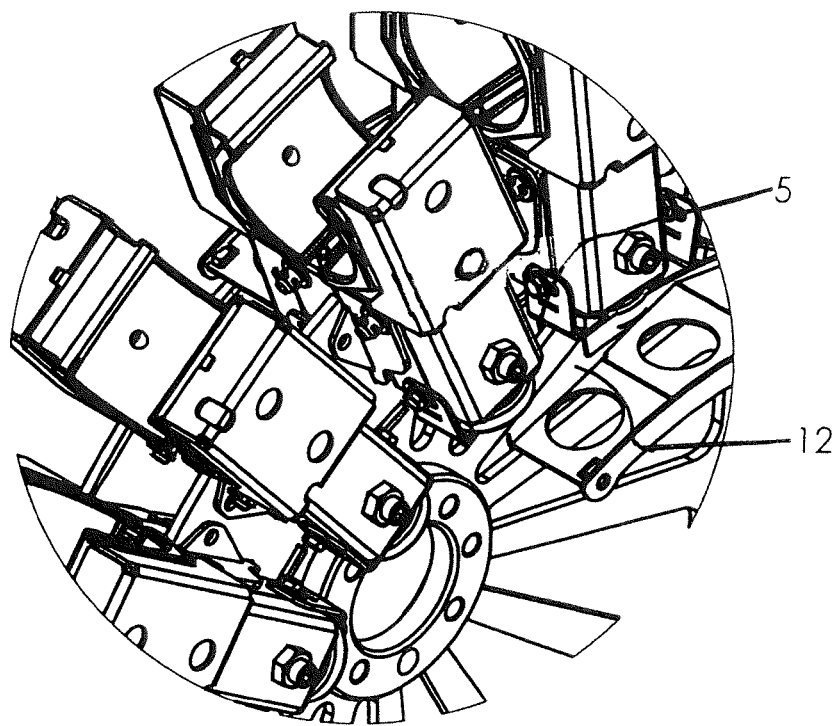
FIG. 7 an enlarged view of a contact of a pipe gripper with a curved path.

FIG. 5 shows in simplified form the insertion device 1 with the curved path 5, which rotates together with the tubular grippers 4 in space as an insertion wheel. The different position of the pipe grippers 4 between the open and closed positions can be seen from the end section of the pipe grippers 4 which faces the curved path 5.

Figure 6:
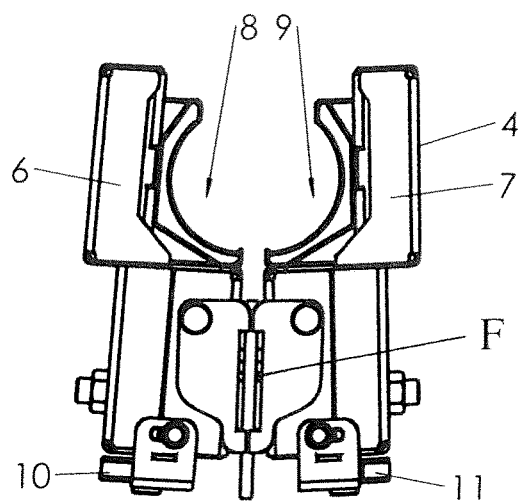
FIG. 6 a pipe gripper in an enlarged view.

It can be seen from FIG. 6 that the pipe gripper 4 is spring-loaded in its closed position. In the embodiment shown here, the pipe gripper 4 has two clamping jaws 6, 7 which are guided symmetrically and are acted upon by a spring F such that the clamping jaws 6, 7 are moved towards one another. In this position, a pipe 2 located between the clamping jaws 6, 7 can be clamped or moved when the pipe gripper 4 moves. The clamping jaws 6, 7 each have an indentation 8, 9 which corresponds to the circumference and the cross-sectional shape of the pipe 2. In addition, measures are provided to increase the friction between the pipe 2 and the clamping jaw 6, 7 and are applied to the regions of the clamping jaw 6, 7 that contact the pipe 2.

If the pipe grippers 4 are loaded in the end area facing the curved path (foot-side area) so that the clamping jaws 6, 7 can move away from each other against the spring force of the spring F, the pipe gripper 4 is moved from its closed position shown in FIG. 6 to an open position. In the open position, the two clamping jaws 6, 7, which are located in the area on the head side (facing away from the curved path 5), are moved away from one another.

The open position is achieved in the exemplary embodiment shown in FIG. 5 in that the two clamping jaws 6, 7 each have a roller 10, 11 with which they move along a switching surface 12 or contact surface which is arranged fixed in space and relative to which the pipe grippers 4 move. If the clamping jaws 6, 7 are pressed together at their end facing the curved path 5, this movement acts against the spring preloading and the clamping jaws 6, 7 are moved into an open position so that the pipe 2 can enter the pipe gripper 4 or the pipe gripper 4 releases the pipe 2.

In the embodiment shown in FIGS. 5 to 8, the elements are coupled purely mechanically in such a way that the pipe gripper 4 is in a closed or an open position depending on its angular position along the curved path 5. The switching surface 12 is designed accordingly.

FIG. 1 also shows that the insertion device 1 has an input guide 13 and an output guide 14. The input guide 13 and the output guide 14 support the pipe 2. The input guide 13 is designed as a sleeve. The output guide 14 is designed in the form of a support for the pipe 2.

Figure 8:
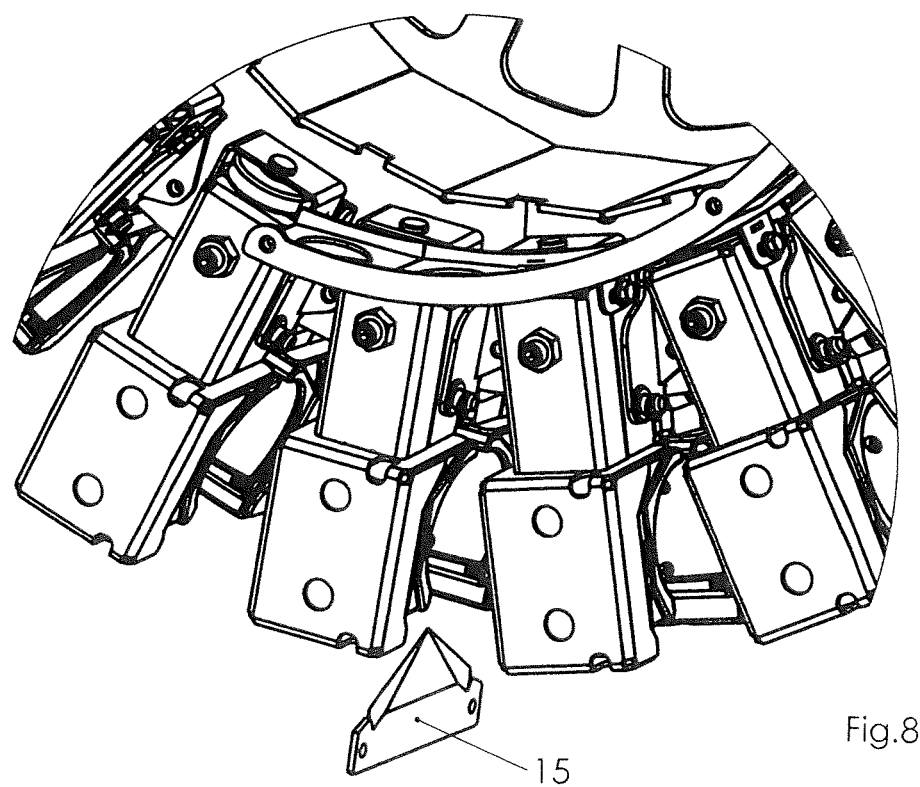
FIG. 8 a device for inserting a pipe into an elongated cavity in an isometric and enlarged view together with a cutting element.

For the exemplary embodiment shown, FIG. 8 shows that a cutting element 15 is present in the lower region of the device 1 (approximately at 6 o'clock). The cutting element 15 can be moved in the circumferential direction of the pipe 2 along and/or radially to the curved path 5 and can be brought up to the pipe 2 in such a way that the cutting element 15 cuts the pipe 2 in the circumferential direction or radially to the curved path 5 or transversely to the longitudinal axis of the pipe 2. For this purpose, the cutting element 15 carries out a circular movement along the circumference transverse to the direction of insertion or a purely translational movement. For this purpose, the cutting element 15 is designed as a pointed, triangular-shaped blade which pierces into the pipe 2 and can cut or sever it in one movement.

A hydraulic drive 17 is provided as a drive for the pipe grippers 4 in order to move with the curved path 5, to which the curved path 5 is connected. The curved path 5 or the inserting wheel 16 is rotated about the axis A transversely to the inserting direction and guides the pipe grippers 4 along this curved path.

A controller 18 is also schematically shown in FIG. 1, which controls the drive 17 for the curved path 5 or the insertion wheel 16. The controller 18 is also designed to control a movement of the cutting element 15, the controller 18 monitoring that the pipe grippers 4 do not rotate simultaneously with the movement of the cutting element 15.

The invention claimed is:

1. Device for inserting a pipe into an elongated cavity, comprising at least two pipe grippers which can be moved along a curved path, each of said at least two pipe grippers arranged and designed to grip the pipe about a circumferential area of the pipe and, wherein, in the gripped state, the at least two pipe grippers grip the pipe along different lateral segments of the pipe, to move it curved at least in sections of the pipe.

2. Device according to claim 1, wherein each said pipe gripper has at least one clamping jaw movable relative to a counter element or a further clamping jaw, and wherein by means of the movement of each said pipe gripper along the curved path it is transferred from an open position, in which the pipe is released, to a closed position, in which the pipe is gripped.

3. Device according to claim 2, wherein the relative movement of the clamping jaw to the counter element or the further clamping jaw between the closed position and the open position is directed essentially transversely to the movement of the pipe gripper on the curved path.

4. Device according to claim 2, wherein the clamping jaw has an indentation which corresponds to the outer circumference of the pipe.

5. Device according claim 2, wherein each said pipe gripper is preloaded in the closed position by means of one or more of
   a) spring preloading,
   b) mechanical intervention,
   c) compressed air,
   d) hydraulics, and
   e) magnetic interaction.

6. Device according to claim 2, wherein the open position and the closed position of each of the at least two pipe grippers are selected as a function of the position of the respective pipe gripper on the curved path.

7. Device according to claim 2, further comprising a contact surface against which the at least two pipe grippers run with a roller, and wherein a corresponding one of the at least two pipe grippers is brought from a preloaded closed position to an open position by means of an interaction of the roller with a configuration of the contact surface.

8. Device according claim 7, wherein each pipe gripper is preloaded in the closed position by means of spring preloading.

9. Device according to claim 1, wherein the curved path is closed and at least in sections is elliptical, circular or polygonal.

10. Device according to claim 1, further comprising a drive configured to move the at least two pipe grippers along the curved path.

11. Device according claim 10, wherein the drive comprises a hydraulic drive.

12. Device according to claim 1, further comprising an input guide positioned in front of the at least two pipe grippers in relation to the direction of movement.

13. Device according to claim 12, wherein the input guide is curved.

14. Device according to claim 1, further comprising a cutting element movably arranged between two adjacent pipe grippers to cut the pipe in at least two sections, and a controller configured to at least one of: a) prevent movement of the pipe grippers when the cutting element is moved, or b) prevent movement of the cutting element when the pipe grippers are moved.

15. Device according to claim 14, wherein the controller is operative to monitor that the pipe grippers do not rotate simultaneously with the movement of the cutting element.

16. Device according to claim 1, further comprising an output guide behind the pipe grippers in relation to the direction of movement.

17. Device according to claim 16, wherein the output guide is curved.

18. Device according to claim 1, wherein said at least two pipe grippers are movable along or relative to a wheel-shaped structure which specifies a course of the curved path.

19. Device according to claim 1, wherein each of the at least two pipe grippers are fastened at separate positions on a rotatable wheel-shaped structure which specifies a course of the curved path, and wherein said at least two pipe grippers are automatically placed in a closed position over a first angular range of the curved path, and in an open position over a second angular range of the curved path.

20. Device according to claim 1, wherein the curved path has a ring closure.

21. Device according to claim 1, wherein the curved path is configured to repeatedly guide the at least two pipe grippers along the curved path in one direction.

22. A method comprising inserting a pipe into an elongated cavity using at least two pipe grippers movable along a curved path, and positioning each of the at least two pipe grippers one behind another with respect to movement of the at least two pipe grippers along the curved path, such that each said pipe gripper, when in the gripped state, grips the pipe about a corresponding area of the pipe to move it curved at least in sections of the pipe.

\* \* \* \* \*